March 28, 1933.  H. F. WILHELM  1,902,980
BELT TIGHTENING PULLEY
Original Filed May 24, 1927
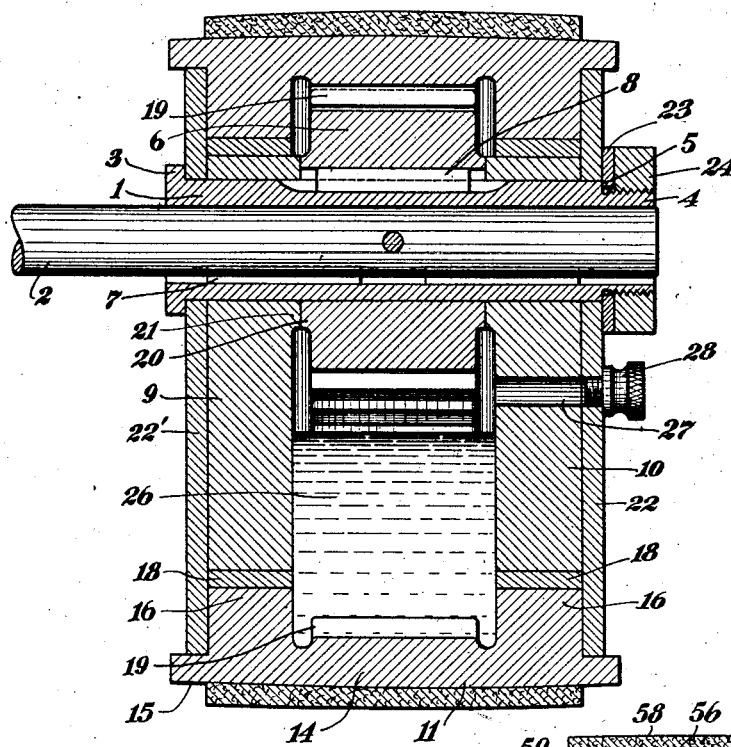
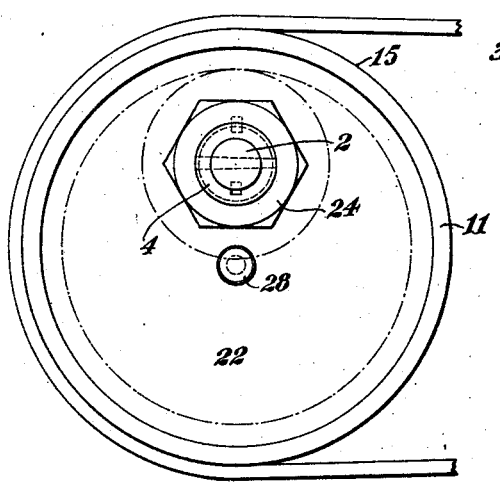
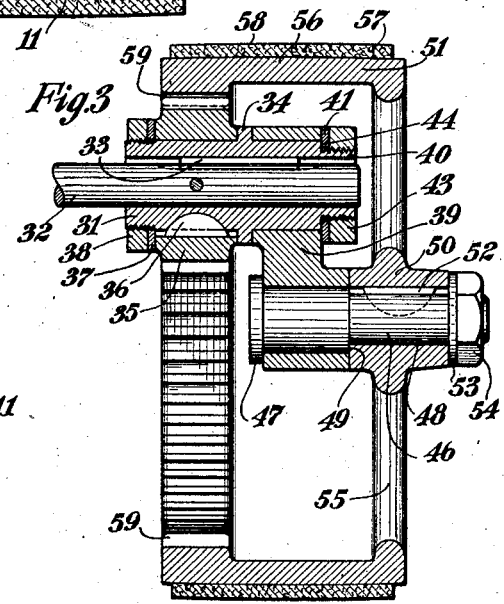
INVENTOR
Harold F. Wilhelm,
BY
Albert N. Austin
ATTORNEY Patented Mar. 28, 1933

1,902,980

UNITED STATES PATENT OFFICE

HAROLD F. WILHELM, OF EAST ORANGE, NEW JERSEY, ASSIGNOR, BY MESNE ASSIGNMENTS, TO WEARN'S INVENTIONS, LTD., OF AUCKLAND, NEW ZEALAND, A CORPORATION OF NEW ZEALAND

BELT TIGHTENING PULLEY

Application filed May 24, 1927, Serial No. 193,773. Renewed August 23, 1932.

The invention relates to power transmission devices, and more particularly, to a belt pulley having incorporated therein mechanism for automatically maintaining the belt at a proper tension.

According to the invention, the device may be made up of a spur gear fixedly secured upon a supporting shaft, an eccentric sheave loosely mounted off center on the shaft and an annular gear having bearing on the sheave with its internal teeth operatively connected to the teeth on the spur gear. The outer surface of the annular gear may constitute the crowned surface of the pulley on which the belt rides. If desired, two eccentric sheaves may be provided with the spur located therebetween to provide greater strength and also a space in which a suitable lubricant may be housed.

A device according to the invention may perform the combined functions of a speed changer, a belt tightener and a shock absorber. The device is completely housed within the pulley and presents an appearance not unlike an ordinary pulley and takes up no more space. The device may be constructed in the form of an attachment which may be mounted either on the driving or driven shaft.

Various other features and advantages of the invention will be apparent from the following particular description and from an inspection of the accompanying drawing.

The invention also consists in certain new and original features of construction and combinations of parts hereinafter set forth and claimed.

Although the novel features which are believed to be characteristic of this invention will be pointed out with particularity in the claims appended hereto, the invention itself, as to its objects and advantages, the mode of its operation and the manner of its organization may be better understood by referring to the following description taken in connection with the accompanying drawing forming a part thereof, in which Fig. 1 is a longitudinal cross section of an embodiment comprising two eccentric sheaves;

Fig. 2 is an end view of Fig. 1; and
Fig. 3 is a modification showing the equivalent of the sheave in the form of a simple arm;

Referring now to the drawing, and more particularly, to Figs. 1 and 2, a sleeve 1 is provided which may be fixedly mounted upon a supporting shaft 2 by any suitable means, such as a key 7. The sleeve has a projecting collar 3 at one end and a threaded reduced portion 4 forming a shoulder 5 at the other end. At approximately the middle of the sleeve 1 a spur gear 6 is provided, rigidly secured to the sleeve 1 by means of a suitable key 8. Loosely mounted upon the sleeve between the spur gear and the ends of the sleeve are spaced, eccentric sheaves 9 and 10, these sheaves being mounted so as to freely rotate on the sleeve. These sheaves have openings providing bearings therefor on the sleeve and outer circular portions providing bearings for the annular gear 11.

The annular gear 11 comprises an outer cylindrical drum 14, slightly crowned to provide a belt supporting surface 15, and inwardly projecting end bearing flanges 16, providing bearing surfaces to rotate upon the sheaves. Suitable bearing material or other friction-reducing devices 18 may be provided between the sheaves and the annular gear.

Between the inwardly projecting bearing flanges is an inwardly projecting tooth portion 19 having teeth meshing with the teeth on the spur gear 6. The spur gear is provided with suitable bosses 20 contacting with the bosses 21 on the sheaves so as to insure clearance between the teeth and the bearing flanges 16.

The annular gear is provided at each end with circular recesses in which may be placed eccentric plates 22 and 22' rotatably mounted on the sleeve, one eccentric plate being disposed between the collar 3 and the eccentric sheave 9, and the other eccentric plate being disposed between the eccentric sheave 10 and a suitable washer 23 and nut 24. The nut 24 is threaded to jam the washer tightly against the shoulder 5.

A suitable opening indicated by 27 may be provided in the sheave 10 and eccentric plate 22 by which the lubricant 26 may be fed into the lubricant chamber. The opening may be closed by a suitable plug 28, threaded into the eccentric plate 22. Since the eccentric sheaves and eccentric plates are, in fact, lever arms of an effective length from the center of the annular gear to the center of the spur gear, the openings in the sheave and plate will remain aligned. It will be seen that the nut 24 effectively holds all the parts in assembled relation.

Referring now to Fig. 3, the sleeve 31 is fixedly mounted upon the supporting shaft 32 by means of a key 33 or other suitable device. Substantially in the middle of the sleeve is a flange collar 34. Fixedly mounted upon the sleeve, against the flanged collar, is a spur gear 35 having a key engagement 36 with the sleeve. A suitable washer 37 and nut 38 threaded upon the sleeve to jam the spur gear 35 against the collar 34.

A simple arm 39 is loosely mounted upon the sleeve between the collar and the reduced end 40 of the sleeve. A suitable washer 41 is placed upon the reduced end and a nut 43 is threaded upon the reduced end to jam the washer 41 against the shoulder 44. The outer end of the arm has a bearing in which may be rotatably mounted a stub shaft 46 having a collar 47 at one end, and at its other end a reduced portion 48 forming a shoulder 49. The hub 50 of an annular gear 51 is fixedly secured on the reduced portion by means of a key 52, and a washer 53 and nut 54 is threaded upon a reduced end of the shaft to jam the hub of the annular gear against the shoulder 49.

The annular gear may be provided with spokes 55 for lightness, and as shown, has a drum portion 56 secured to the spokes, the drum portion having a crowned surface 57 on which the belt 58 may lie. On the inside of the drum portion may be internal teeth 59 meshing with the teeth on the spur gear 35.

Although certain specific means have been shown for fixing the several elements on the several shafts for purposes of illustrating the invention, it will be understood that any of the usual expedients for this purpose can be used within the teachings of the invention.

The kinematic action of both species is substantially identical. The devices may be used either on driving or driven shafts. In either case when the rotation of the pulley is right, the resistance of the load will cause the larger gear to creep around the center of the smaller gear to tighten the belt. This creeping action will occur until the tension of the belt is sufficient to overcome this creeping action. The greater the load, the more the creeping action and the tighter the belt will become. Thus the devices are inherently automatic belt tighteners.

The devices are also shock absorbers, since, if the load is suddenly increased, an appreciable time must elapse before the larger gear can creep sufficiently to tighten the belt, during which time the belt may slip slightly, absorbing the shock. The devices are also speed changers, the speed being increased if the devices are used on the driven shaft and decreased if used on a driving shaft.

The devices are rugged, efficient, self-contained and compact. They take up no more room than an ordinary pulley and have an appearance similar to the usual pulley. The device shown in Figs. 1 and 2 having a lubrication chamber inherently built therein has the additional advantage of insurance of continual excellent lubrication.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. A power transmitting wheel comprising a supporting shaft, a first gear affixed to said shaft, an eccentric sheave loosely mounted on said shaft, an annular gear having an outer band supporting surface and internal teeth having driving relation with the teeth on said first gear, said annular gear also having a bearing surface rotatably mounted on said sheave.

2. A band tightening, power transmitting wheel comprising a supporting shaft, a spur gear affixed to said shaft, an eccentric sheave loosely mounted on said shaft, an annular gear having an outer band supporting portion and internal teeth meshing the teeth on said spur gear, said annular gear also having an internal bearing surface rotatably mounted on said sheave.

3. A power transmission device comprising a supporting shaft, a spur gear fixedly secured to said shaft, eccentric sheaves loosely mounted on said shaft one on each side of said spur gear, an annular gear having a central internal tooth portion meshing with the teeth on said spur gear and bearing portions having bearing relation to said sheaves, said annular gear having an outer band supporting portion, and means for holding said parts in assembled relation.

4. A band tightening wheel comprising a sleeve adapted to be secured on a supporting shaft, a spur gear fixedly secured to said sleeve, eccentric sheaves loosely mounted on said sleeve one on each side of said spur gear, an annular gear having a central internal tooth portion meshing with the teeth on said spur gear and bearing portions having bearing relation to said sheaves, said annular gear having an outer band supporting portion, eccentric plates loosely mounted on said sleeve and abutting said sheaves and annular gear and abutment means on the ends of said sleeve.

5. A belt tightening pulley comprising a sleeve adapted to be secured on a supporting shaft, a spur gear fixedly secured to said sleeve, eccentric sheaves loosely mounted on said sleeve, one on each side of said spur gear, an annular gear having a central internal tooth portion meshing the teeth on said spur gear and bearing flanges having bearing relation to said sheaves, said annular gear having an outer belt surface and recesses in its outer ends, eccentric plates loosely mounted on said sleeve and disposed in said recesses, abutment means on the ends of said sleeve, one of said plates and adjoining sheave having an opening to feed lubricant to the chamber formed by said annular gear and sheaves, and a closure for said opening.

6. A power transmission device comprising a supporting shaft, a spur gear fixedly secured to said shaft, eccentric sheaves loosely mounted on said shaft, one on each side of said spur gear, an annular gear having a central internal tooth portion meshing with the teeth on said spur gear and bearing portions having bearing relation to said sheaves forming with said sheaves an oil chamber, means for applying oil to said chamber, and means for holding said parts in assembled relation.

7. A power transmission device comprising a supporting shaft, a spur gear fixedly secured to said shaft, eccentric sheaves loosely mounted on said shaft, one on each side of said spur gear, an annular gear having a central internal tooth portion meshing with the teeth on said spur gear and bearing portions having bearing relation to said sheaves forming with said sheaves an oil chamber, eccentric plates journalled on said shaft and cooperating with said annular gear for holding the same in aligned position, one of said sheaves and its adjacent plate having aligned holes to permit application of oil to said chamber.

In testimony whereof I have hereunto set my hand.

HAROLD F. WILHELM.